US012674901B2

(12) United States Patent
Ozharar et al.

(10) Patent No.: US 12,674,901 B2
(45) Date of Patent: Jul. 7, 2026

(54) RANGE AND CAPABILITY EXTENDING DEVICE FOR PERIMETER INTRUSION DETECTION

(71) Applicant: NEC Laboratories America, Inc., Princeton, NJ (US)

(72) Inventors: Sarper Ozharar, Pennington, NJ (US); Yue Tian, Princeton, NJ (US); Yangmin Ding, East Brunswick, NJ (US); Ting Wang, West Windsor, NJ (US)

(73) Assignee: NEC Corporation, Tokyo (JP)

( * ) Notice: Subject to any disclaimer, the term of this patent is extended or adjusted under 35 U.S.C. 154(b) by 28 days.

(21) Appl. No.: 18/485,211

(22) Filed: Oct. 11, 2023

(65) Prior Publication Data

US 2024/0127681 A1 Apr. 18, 2024

Related U.S. Application Data

(60) Provisional application No. 63/415,408, filed on Oct. 12, 2022.

(51) Int. Cl.
*G01V 1/00* (2006.01)
*G01V 1/22* (2006.01)

(52) U.S. Cl.
CPC ............... *G01V 1/001* (2013.01); *G01V 1/00* (2013.01); *G01V 1/22* (2013.01); *G01V 1/226* (2013.01)

(58) Field of Classification Search
CPC ........ G08B 13/00; G08B 13/10; G08B 13/12; G08B 13/186; G08B 13/194; G08B 13/196; G01V 1/00; G01V 1/001; G01V 1/22; G01V 1/226; H04B 10/00; H04B 10/071; H04B 10/2575; H04B 10/27; H04B 10/40
See application file for complete search history.

(56) References Cited

U.S. PATENT DOCUMENTS

2018/0180753 A1* 6/2018 Rajeev ................... G01H 9/004
2020/0313763 A1* 10/2020 Wang ............... H04B 10/25753
2021/0407262 A1* 12/2021 Farneman ........ G08B 13/19619

* cited by examiner

*Primary Examiner* — Van T Trieu
(74) *Attorney, Agent, or Firm* — Vincent Duffy; Joseph Kolodka

(57) ABSTRACT

A solar powered, self-contained DFOS extender that includes a wide-angle camera and a microphone. The DFOS extender monitors the perimeter constantly or at predetermined time intervals both visually and acoustically. It analyses these signals and if an alarming event is detected (such as an animal, a human, a car, or a truck seen or heard), then the DFOS extender generates a coded vibration via its in-built acoustic modem. These coded vibrations are detected by the fiber and an event log is generated. Consequently, a trespasser or false alarms (animals) are detected before they are within detectable distance of the underground DFOS optical sensor fiber. Advantageously, our DFOS extender can be placed in critical locations along a border where an increased detection range is desired and may later be relocated/reinstalled at other locations as well.

8 Claims, 6 Drawing Sheets

Potential trespassers

Microphone

Camera Solar Panel

Vibrator

Coded Vibrations Cross-section of the fiber cable

DAC: Digital-to-analog converter
ADC: Analog-to-digital converter
DSP: Digital signal processing
WDM: Wavelength division multiplexer
BPF: Band-pass filter
LPF: Low-pass filter

RANGE AND CAPABILITY EXTENDING DEVICE FOR PERIMETER INTRUSION DETECTION

CROSS-REFERENCE TO RELATED APPLICATIONS

This application claims the benefit of U.S. Provisional Patent Application Ser. No. 63/415,408 filed Oct. 12, 2022, the entire contents of which is incorporated by reference as if set forth at length herein.

FIELD OF THE INVENTION

This application relates to distributed fiber optic sensing (DFOS)/distributed acoustic sensing (DAS) systems, methods, and structures. More particularly, it pertains to a range and capability extending device for perimeter intrusion detection.

BACKGROUND OF THE INVENTION

One of the great advantages of a distributed fiber optic sensing system is its ability to monitor a long linear region via an installed optical sensing fiber without providing electrical power along that field region. One application that benefits from this advantageous characteristic is a border/perimeter intrusion detection application. In such an application, the optical sensor fiber is typically installed under-ground—for example 3 feet below ground—and is used to detect, localize, and identify vibrations caused by trespass-ing entities including vehicles, persons, animals, etc.

Vibration signals so detected can be further analyzed and classified by a machine learning model to improve the identification capabilities of the DFOS system. However, such a DFOS system is still limited by detection range, and length of optical sensor fiber employed. More particularly, a trespasser is detected by the DFOS system unless/until he/she/it is close enough to the optical sensor fiber such that a vibration signal is produced strong enough to excite the fiber.

SUMMARY OF THE INVENTION

The above problem is solved and an advance in the art is made according to aspects of the present disclosure directed to a range and capability extending device for perimeter intrusion detection systems that employ distributed fiber optic sensing.

In sharp contrast to the prior art, systems, and methods according to the present disclosure employ a solar powered, self-contained DFOS extender. The DFOS extender includes a wide-angle camera and a microphone. The DFOS extender monitors the perimeter constantly or at predetermined time intervals both visually and acoustically. It analyses these signals and if an alarming event is detected (such as an animal, a human, a car, or a truck seen or heard), then the DFOS extender generates a coded vibration via its in-built acoustic modem. These coded vibrations are detected by the fiber and an event log is generated. Consequently, a tres-passer or false alarms (animals) are detected before they are within detectable distance of the underground DFOS optical sensor fiber. Advantageously, our DFOS extender can be placed in critical locations along a border where an increased detection range is desired and may later be relo-cated/reinstalled at other locations as well.

As we shall show and describe further there are three methods for acoustic modem transmission from the DFOS extender. First, the DFOS extender may analyze any audio-visual input and then transmit different vibrations based on the detected event (vehicle, human, group of humans, ani-mal, etc.) such that a DFOS system located in a central office may also detect/determine the event in addition to its loca-tion. Second, the DFOS extender may directly transmit an audio-visual input to the DFOS sensor fiber using encoded vibrations such that the DFOS system receives the raw video and audio data from the field directly and applies any necessary analysis or modeling. Finally, a combination of these two approaches may be employed wherein the DFOS extender transmits a portion of the raw data along with its analysis results to the DFOS system via the DFOS optical sensor fiber through coded vibrations.

DETAILED DESCRIPTION OF THE INVENTION

Figure 1A:
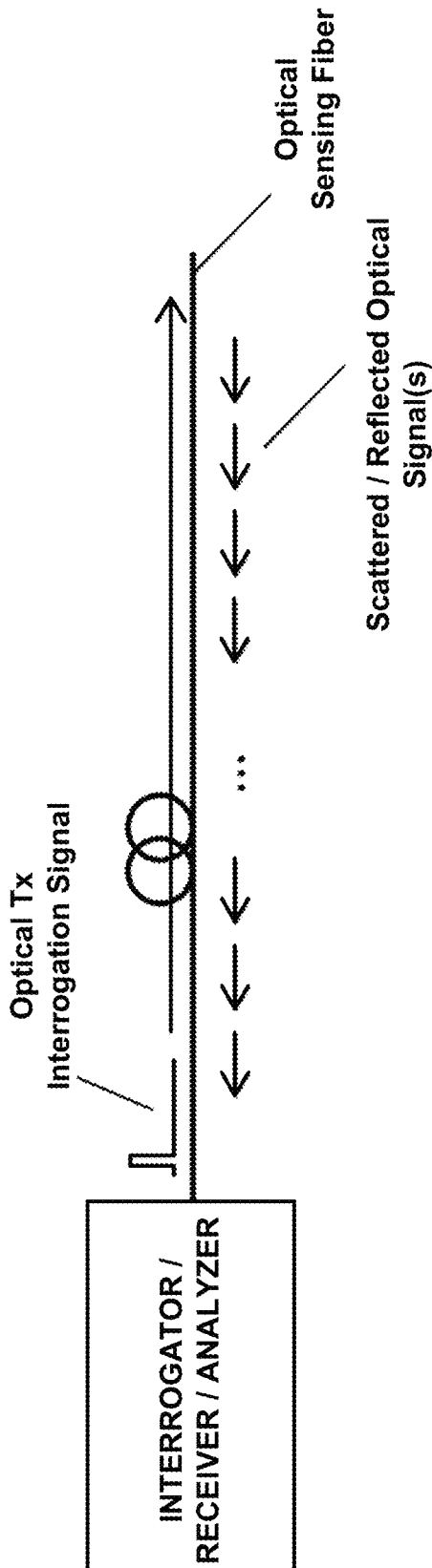
FIG. 1(A) and FIG. 1(B) are schematic diagrams showing an illustrative prior art uncoded and coded DFOS systems.

The following merely illustrates the principles of this disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor (s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent concep-tual views of illustrative circuitry embodying the principles of the disclosure.

Unless otherwise explicitly specified herein, the FIGs comprising the drawing are not drawn to scale.

By way of some additional background, we note that distributed fiber optic sensing systems interconnect optoelectronic integrators to an optical fiber (or cable), converting the fiber to an array of sensors distributed along the length of the fiber. In effect, the fiber becomes a sensor, while the interrogator generates/injects laser light energy into the fiber and senses/detects events along the fiber length.

As those skilled in the art will understand and appreciate, DFOS technology can be deployed to continuously monitor vehicle movement, human traffic, excavating activity, seismic activity, temperatures, structural integrity, liquid and gas leaks, and many other conditions and activities. It is used around the world to monitor power stations, telecom networks, railways, roads, bridges, international borders, critical infrastructure, terrestrial and subsea power and pipelines, and downhole applications in oil, gas, and enhanced geothermal electricity generation. Advantageously, distributed fiber optic sensing is not constrained by line of sight or remote power access and—depending on system configuration—can be deployed in continuous lengths exceeding 30 miles with sensing/detection at every point along its length. As such, cost per sensing point over great distances typically cannot be matched by competing technologies.

Distributed fiber optic sensing measures changes in "backscattering" of light occurring in an optical sensing fiber when the sensing fiber encounters environmental changes including vibration, strain, or temperature change events. As noted, the sensing fiber serves as sensor over its entire length, delivering real time information on physical/environmental surroundings, and fiber integrity/security. Furthermore, distributed fiber optic sensing data pinpoints a precise location of events and conditions occurring at or near the sensing fiber.

Figure 1B:
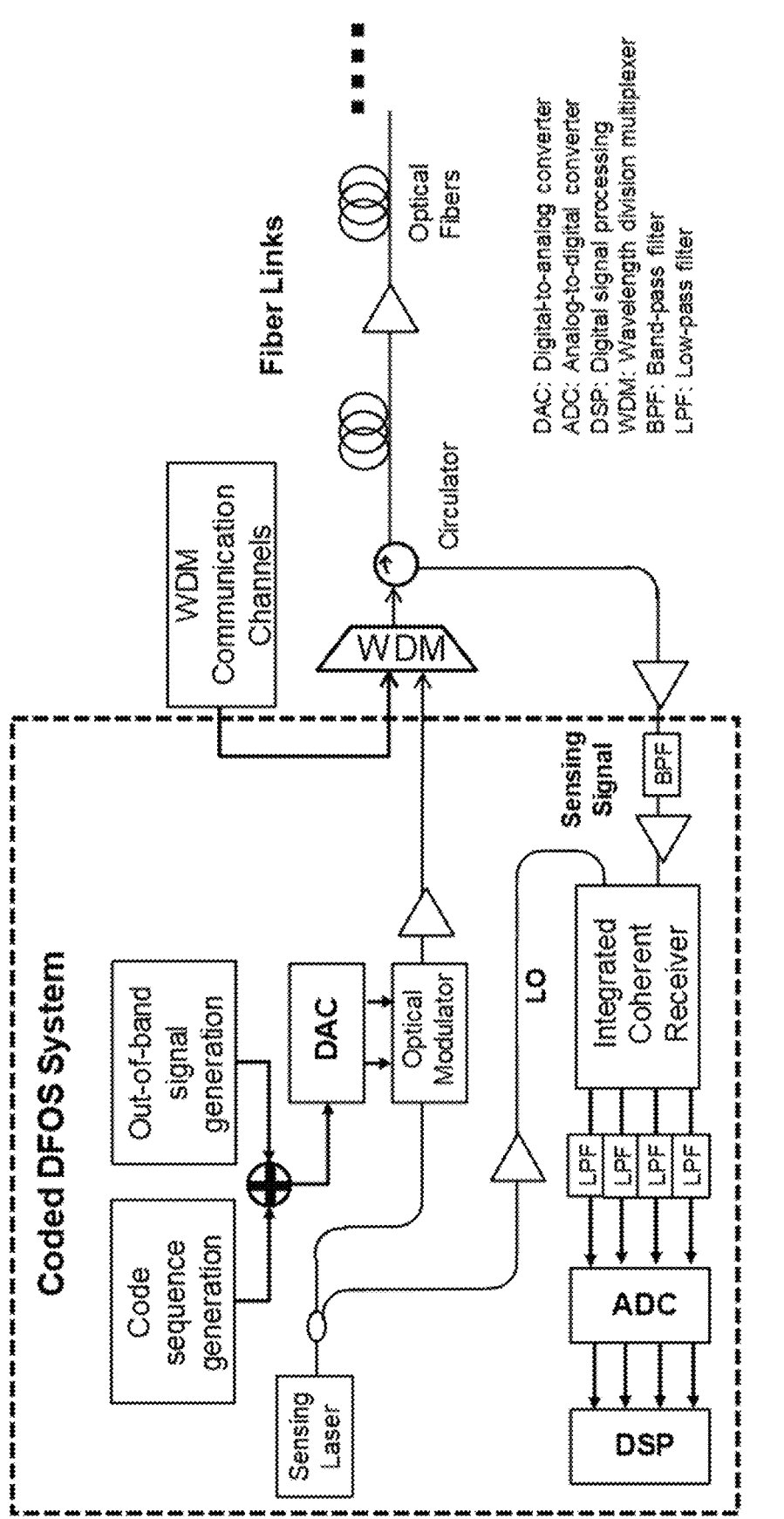

A schematic diagram illustrating the generalized arrangement and operation of a distributed fiber optic sensing system that may advantageously include artificial intelligence/machine learning (AI/ML) analysis is shown illustratively in FIG. 1(A). With reference to FIG. 1(A), one may observe an optical sensing fiber that in turn is connected to an interrogator. While not shown in detail, the interrogator may include a coded DFOS system that may employ a coherent receiver arrangement known in the art such as that illustrated in FIG. 1(B).

As is known, contemporary interrogators are systems that generate an input signal to the optical sensing fiber and detects/analyzes reflected/backscattered and subsequently received signal(s). The received signals are analyzed, and an output is generated which is indicative of the environmental conditions encountered along the length of the fiber. The backscattered signal(s) so received may result from reflections in the fiber, such as Raman backscattering, Rayleigh backscattering, and Brillion backscattering.

As will be appreciated, a contemporary DFOS system includes the interrogator that periodically generates optical pulses (or any coded signal) and injects them into an optical sensing fiber. The injected optical pulse signal is conveyed along the length optical fiber.

At locations along the length of the fiber, a small portion of signal is backscattered/reflected and conveyed back to the interrogator wherein it is received. The backscattered/reflected signal carries information the interrogator uses to detect, such as a power level change that indicates—for example—a mechanical vibration.

The received backscattered signal is converted to electrical domain and processed inside the interrogator. Based on the pulse injection time and the time the received signal is detected, the interrogator determines at which location along the length of the optical sensing fiber the received signal is returning from, thus able to sense the activity of each location along the length of the optical sensing fiber. According to aspects of the present disclosure, classification methods may be further used to detect and locate events or other environmental conditions including acoustic and/or vibrational and/or thermal along the length of the optical sensing fiber.

As noted, the present disclosure describes systems, methods, and structures that provide the identification of an individual optical fiber which locates a fiber of interest when such fiber is one of many fibers that may be—for example—co-located in a single fiber optic cable.

Figure 2:
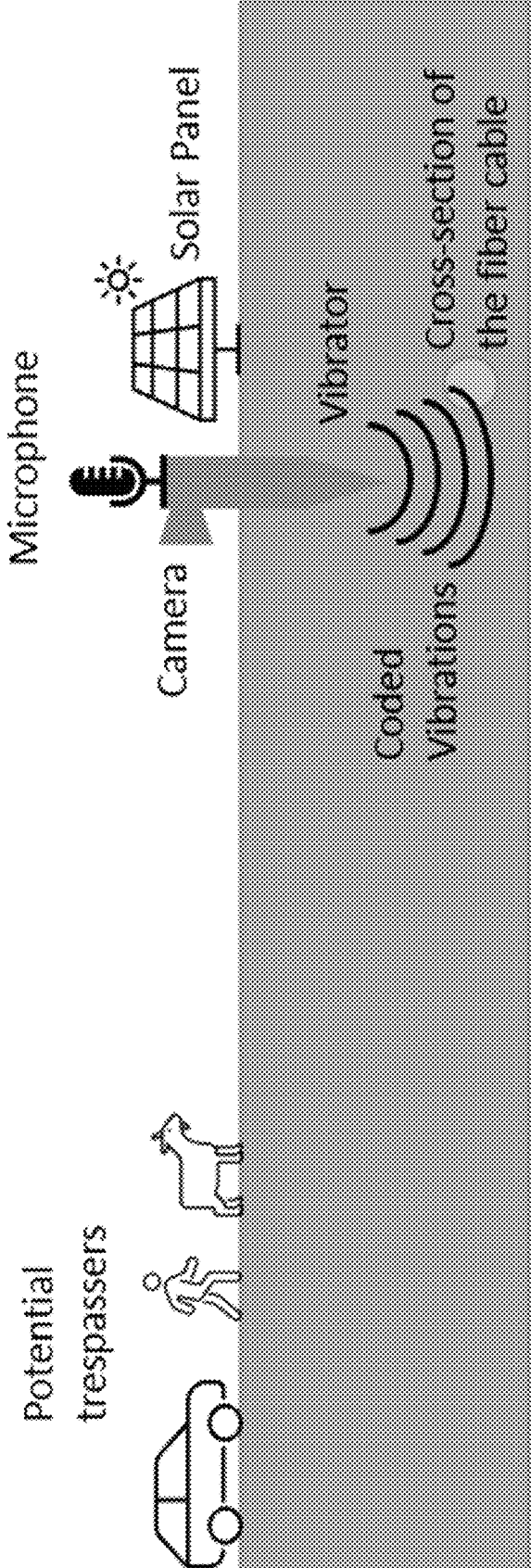
FIG. 2. Is a schematic diagram showing an illustrative DFOS extender and application according to aspects of the present disclosure.

FIG. 2. Is a schematic diagram showing an illustrative DFOS extender and application according to aspects of the present disclosure. As schematically illustrated in that figure, an area that is being monitored is experiencing vehicular, human, and animal trespassers. A solar powered DFOS extender according to aspects of the present disclosure is within its sensory proximity to the trespassers and—in this illustrative scenario—detects the trespassers using its camera or microphone. We note that the trespassers are assumed to be out of sensor range of an underground optical sensor fiber that is part of a DFOS system including a remote (at central office) DFOS interrogator and DFOS analyzer.

Even though the trespassers are outside of DFOS sensor range, the DFOS extender may advantageously detect their presence using either its microphone or camera or vibration sensors that may include accelerometers. Once detected, the DFOS extender may then further analyze the nature of the detected trespassers and encode a particular vibration pattern sufficient to excite the underground optical sensor fiber of the DFOS system.

Of particular importance, our inventive DFOS extender according to aspects of the present disclosure provides the following.

The DFOS extender—according to the present disclosure—provides vibrations underground to a buried DFOS optical sensor fiber.

The DFOS extender—according to the present disclosure—is completely self-sufficient in terms of electrical power as it is solar/battery powered and communicates through acoustic vibrations directed underground to a DFOS optical sensor fiber.

The DFOS extender—according to the present disclosure—does not require any wireless or wired communication. As a result, it is immune to hacking or external remote modification and/or eavesdropping.

Finally, the DFOS extender may be configured to transmit sensed visual and audio input as coded vibrations to the DFOS optical sensor fiber. In this inventive manner, it is a data to vibration converter/encoder for DFOS purposes.

Figure 3:
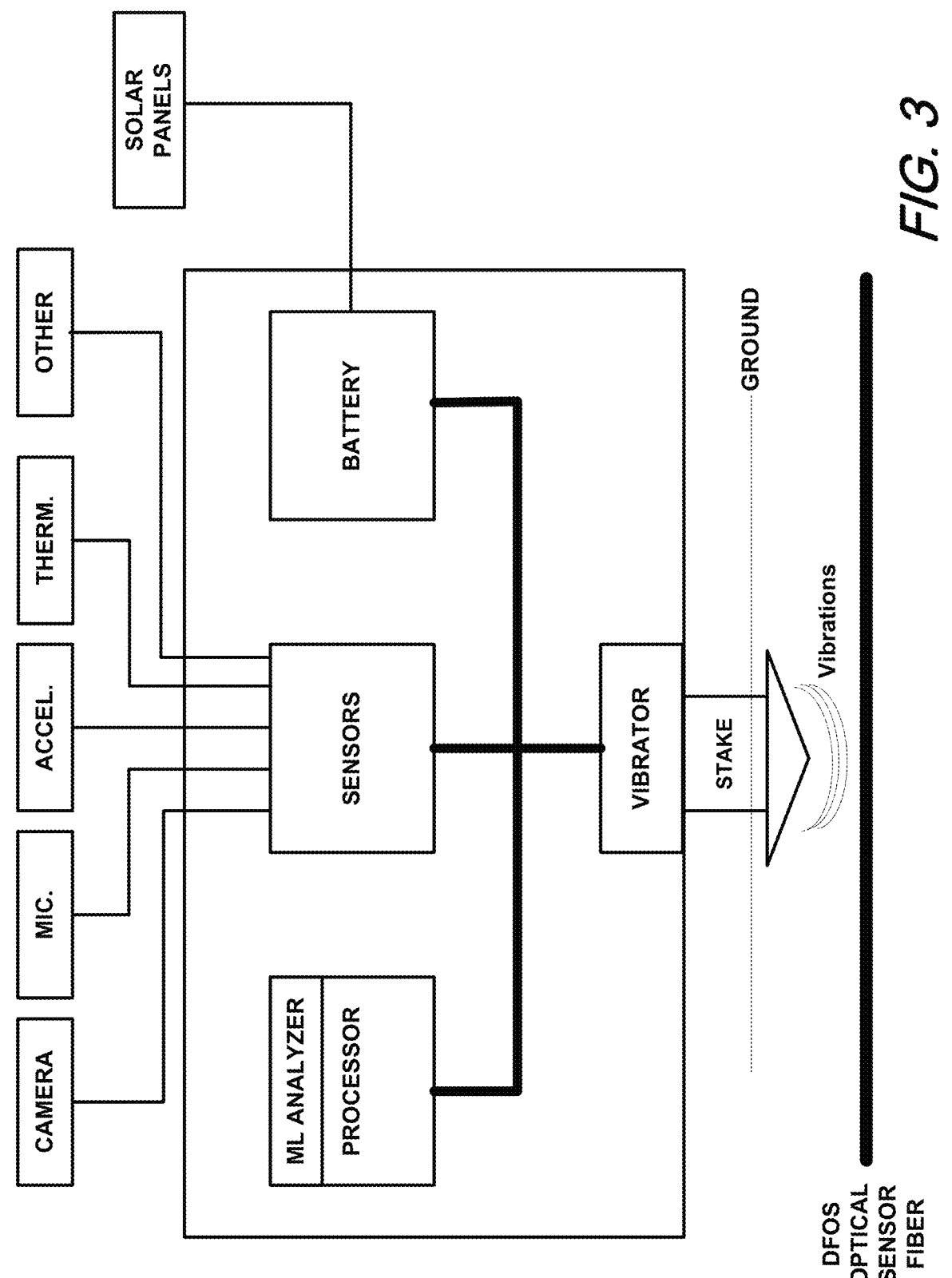
FIG. 3 is a schematic block diagram showing an illustra-tive DFOS extender according to aspects of the present disclosure.

FIG. 3 is a schematic block diagram showing an illustrative DFOS extender according to aspects of the present disclosure. With reference to that figure, it may be observed that the DFOS extender includes a vibrator, sensors, processor, and power/battery.

In an illustrative configuration, the vibrator is activated by the processor and is mechanically coupled to the ground such that when it vibrates, the vibration signals so generated may be detected by an underground DFOS optical sensor fiber. The sensors, including cameras, microphones, accelerometers, infrared IR thermal sensors, vibration sensors, or other environmental sensors are also under processor control and when one or more of the sensors detect a trespasser, the processor will detect/analyze the sensory signal(s) of the DFOS extender and activate the vibrator as appropriate. As noted previously, the vibratory signals generated by the DFOS extender may be encoded to specifically identify the sensed trespasser or may encode in the vibratory signals the visual, audio, vibratory or other sensory signals detected by the DFOS extender sensors. The processor collects and analyzes the sensor data, classifies the sensed data with a machine learning operation—if so configured—and transmits vibrationally either the raw sensor data or the analyzed—including ML classification if so configured—output. Finally, the power/battery provides power to the operation of the DFOS extender and during periods of solar energy availability, recharges the battery using a solar panel.

Figure 4:
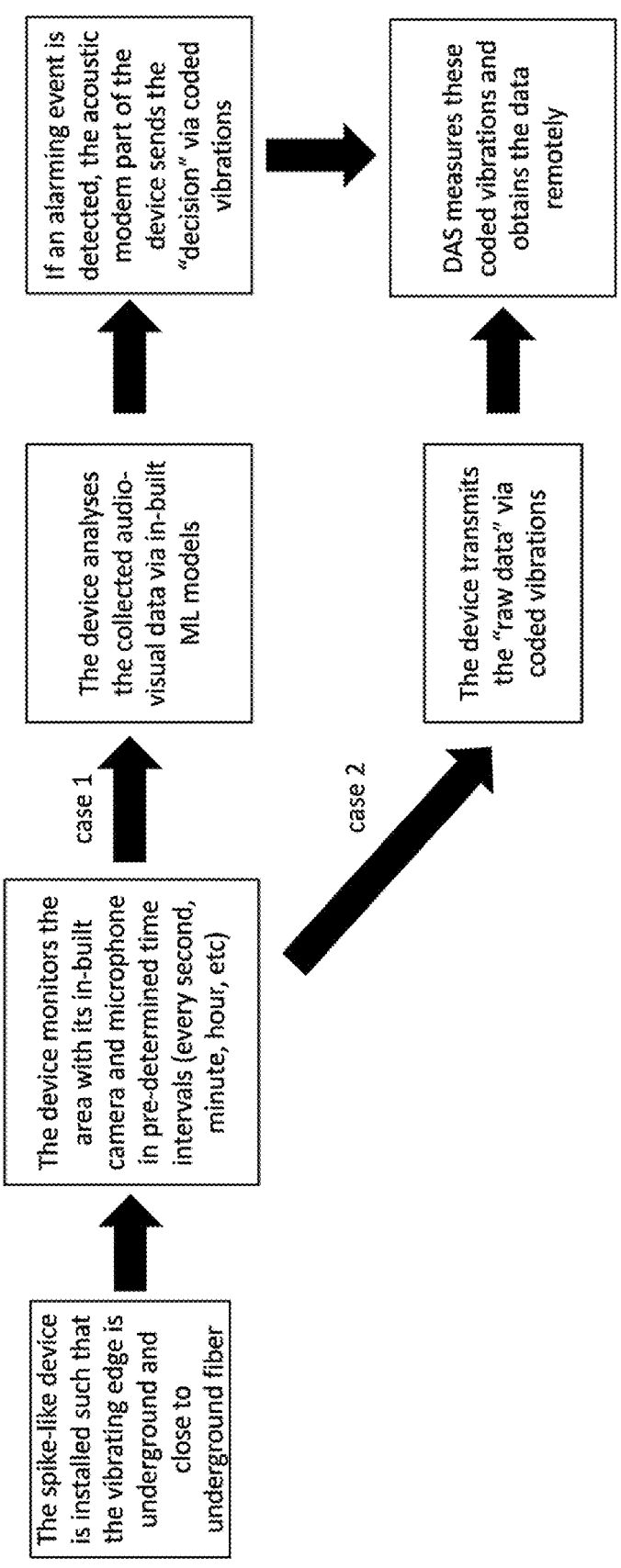
FIG. 4 is a schematic flow diagram showing illustrative operational procedure of a pair of situational cases employ-ing the DFOS extender according to aspects of the present disclosure.

FIG. 4 is a schematic flow diagram showing illustrative operational procedure of a pair of situational cases employing the DFOS extender according to aspects of the present disclosure. With reference to that figure, it may be observed that the DFOS extender may include a spike-shaped structure that permits intimate ground contact such that the vibrator is able to excite an underground vibrating edge that is sufficiently close to an underground DFOS optical sensor fiber to excite that optical sensor fiber when the vibrator is activated under processor control.

The DFOS extender monitors an area in which it is located through its built-in camera, microphone, accelerometer, IR, or other thermal sensor at pre-determined time intervals such as every second, minute, hour, etc.

In one scenario, the DFOS extender analyzes any collected sensor data in real time. Such analysis may include ML analysis by a ML process operating in the processor or hard ML structure. If an alarming event that exceeds a pre-determined threshold is detected, the vibrator including an acoustic modem sends decision to DFOS system via coded vibrations that excite DFOS optical sensor fiber and subsequently detected by the DFOS system. The DFOS system detects/analyzes the coded vibrations and obtains any necessary data to take any necessary actions.

As an alternative, we note that our inventive DFOS extender may transmit "raw" sensor data via coded vibrations that are similarly detected/analyzed by the DFOS system.

Operationally, our inventive DFOS extender monitors an area that is installed at with its camera, microphone and other sensors if included.

In one use case: the DFOS extender transforms raw sensor data (audio-visual-environmental) into a coded vibration pattern and generates those vibrations in pre-determined time intervals, such as every minute, every hour, etc. The coded vibrations excite the underground DFOS optical sensor fiber and are subsequently detected, decoded, and analyzed by the DFOS system. As a result, the DFOS system receives audio-visual-environmental data from field locations that are effectively outside of its normal detection range. In addition, since the DFOS works in real-time and determines the location of the vibration source, the DAS will know the data location and time as well.

In another use case: the DFOS extender classifies the raw sensor data (audio-visual-environmental) via its in-built ML, and checks for any alarming events such as: trespassing humans, vehicles, animals etc. in pre-determined time intervals, such as every minute, every hour, etc. If the DFOS extender determines that there is an alarming event, then the DFOS extender generates a corresponding vibration pattern and generates these vibrations The unique vibration patterns excite the underground DFOS optical sensor fiber and are remotely picked up and detected, decoded, analyzed by the DFOS system. As a result, the DFOS system receives notification of the alarming event data from the field. In addition, since the DFOS system operates in real-time and determines the location of the vibration source, the DFOS system knows the event location and time as well. As a result, the invention enhances the range and capabilities of the DAS system working with underground cables.

Figure 5:
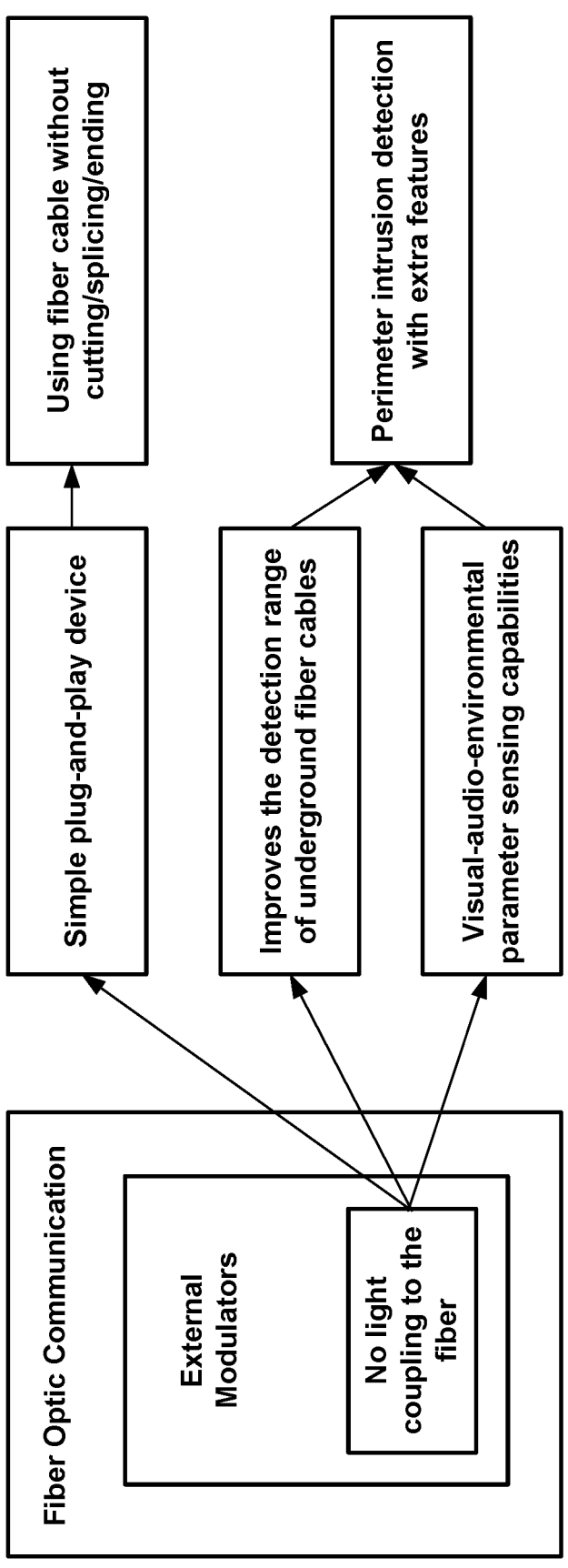
FIG. 5 is a schematic diagram showing illustrative fea-tures provided by DFOS extender according to aspects of the present disclosure.

FIG. 5 is a schematic diagram showing illustrative features provided by DFOS extender according to aspects of the present disclosure.

At this point, while we have presented this disclosure using some specific examples, those skilled in the art will recognize that our teachings are not so limited. Accordingly, this disclosure should only be limited by the scope of the claims attached hereto.

The invention claimed is:

1. A range and capability extender for perimeter intrusion detection comprising:
    a solar-powered, self-contained device configured to be placed in an area outside a detectable range of a buried optical sensor fiber of a distributed fiber optic sensing (DFOS) system;
    the device comprising:
        one or more sensors for detecting trespassers within the area, wherein the one or more sensors include at least one of a wide-angle camera and a microphone;
        a built-in acoustic modem configured to generate mechanical vibrations into a ground area; and
        circuitry configured to:
            analyze signals from the one or more sensors to detect an alarming event; and
            in response to detecting the alarming event, activate the built-in acoustic modem to generate a coded vibration that is detected by the buried optical sensor fiber.

2. The range and capability extender for perimeter intrusion detection of claim 1, wherein the self-contained device is configured to be solar/battery powered and is configured to generate and store electrical power for operating the one or more sensors and the built-in acoustic modem.

3. The range and capability extender for perimeter intrusion detection of claim 1, wherein the alarming event is a detected vehicle, human, group of humans, or animal.

4. The range and capability extender for perimeter intrusion detection of claim 1, wherein the circuitry is further configured to transmit different coded vibrations based on the detected alarming event.

5. The range and capability extender for perimeter intrusion detection of claim 1, wherein the coded vibrations are representative of at least a portion of raw sensor data generated by the one or more sensors.

6. The range and capability extender for perimeter intrusion detection of claim 1, wherein the alarming event is detected by the extender before the trespasser is within a detectable distance of the DFOS system's optical sensor fiber.

7. The range and capability extender for intrusion detection of claim 1, wherein the circuitry is further configured to transmit a portion of raw sensor data along with analysis results via the coded vibrations.

8. The range and capability extender for perimeter intrusion detection of claim 1, wherein the trespasser is a vehicle, a human, or an animal.

* * * * *